United States Patent [19]
Yasuda et al.

[11] 3,891,890
[45] June 24, 1975

[54] LIGHT PEN POSITION DETECTOR FOR COLOR DISPLAY DEVICE

[75] Inventors: Isao Yasuda; Akira Osawa, both of Hitachi, Japan

[73] Assignee: Hitachi, Ltd., Japan

[22] Filed: Aug. 3, 1973

[21] Appl. No.: 385,335

[30] Foreign Application Priority Data
Aug. 7, 1972  Japan.............................. 47-78381

[52] U.S. Cl............................. 315/365; 340/324 A
[51] Int. Cl........................................... G06k 15/20
[58] Field of Search........ 315/22, 18, 365; 250/216, 250/227, 568–70; 340/324 A, 324 AD, 173 CR

[56] References Cited
UNITED STATES PATENTS
| | | | |
|---|---|---|---|
| 3,579,225 | 5/1971 | Clark | 340/324 A |
| 3,659,281 | 4/1972 | Mori | 340/324 A |

Primary Examiner—Maynard R. Wilbur
Assistant Examiner—J. M. Potenza
Attorney, Agent, or Firm—Craig & Antonelli

[57] ABSTRACT

In a color display device for displaying numerals, alphabets, figures and the like patterns by utilizing the widely-used cathode-ray tube for color television, an apparatus which is capable of detecting accurately any position on the screen of the cathode ray tube indicated by a light pen.

11 Claims, 3 Drawing Figures

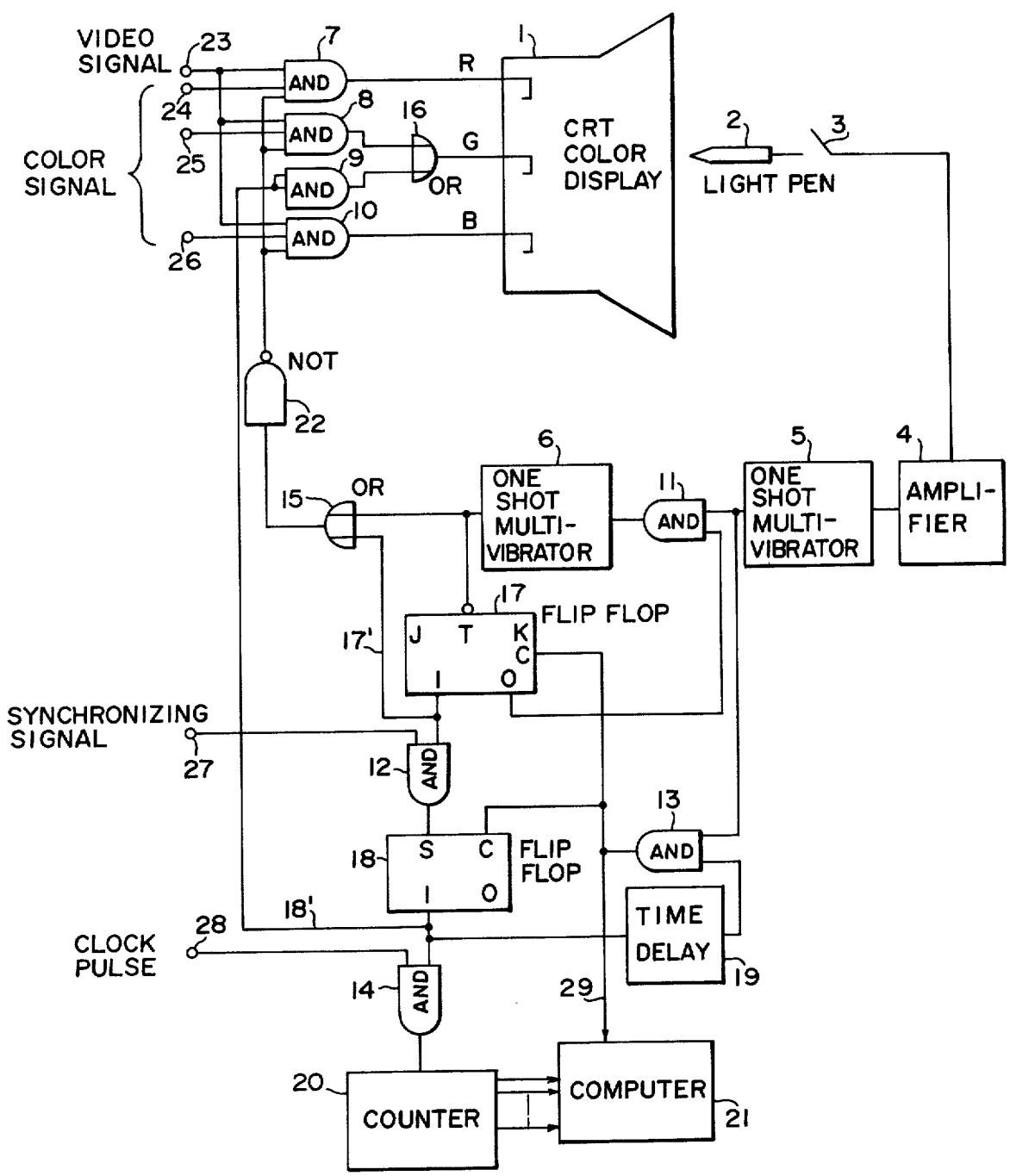

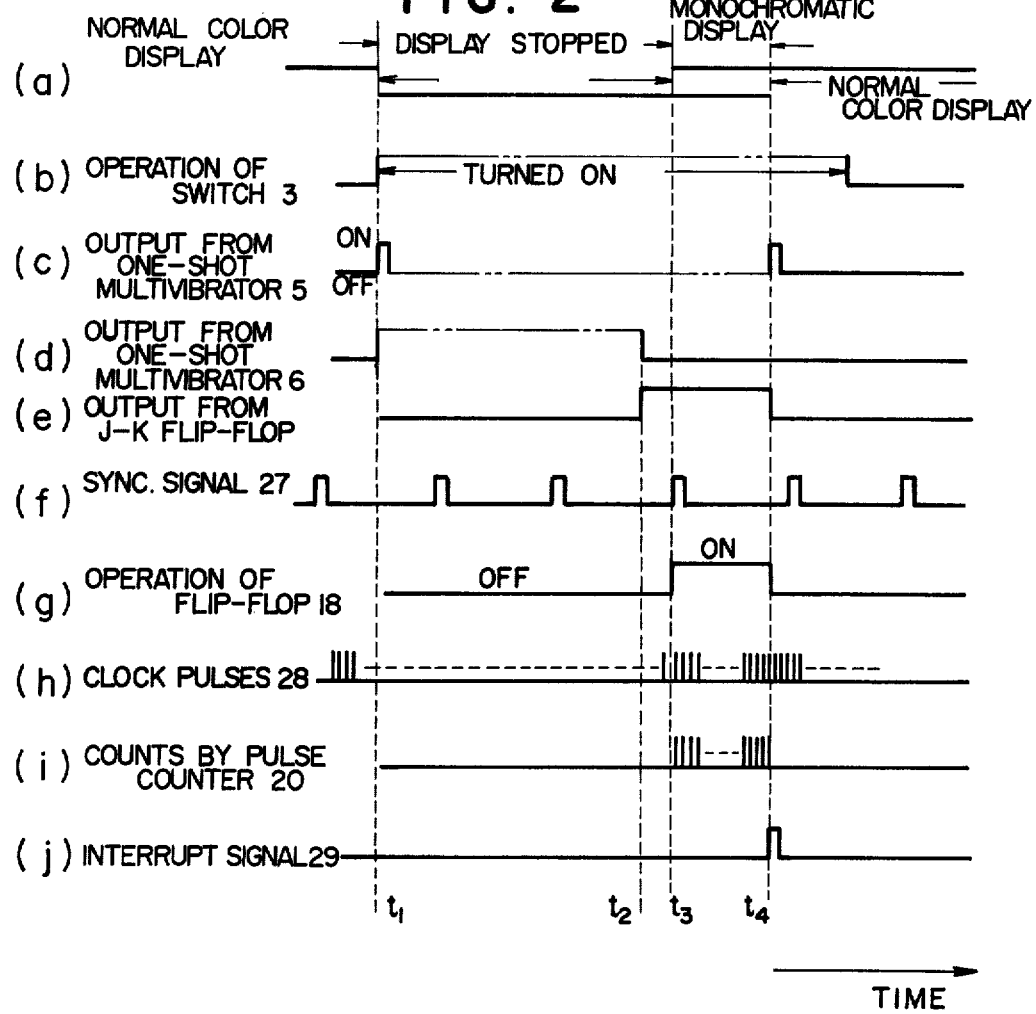
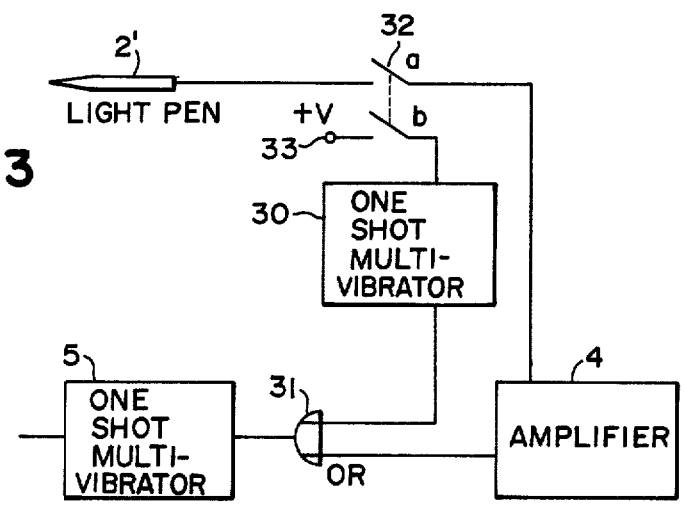

LIGHT PEN POSITION DETECTOR FOR COLOR DISPLAY DEVICE

BACKGROUND OF THE INVENTION

1. Field of the Invention

This invention relates to an apparatus for accurately detecting any position on the screen of a cathode-ray tube (hereinafter referred to as a "CRT") indicated by a light pen in a color display device employing the CRT.

2. Description of the Prior Art

A light pen is a light-sensitive device for detecting any desired position on a CRT screen in response to the presence or absence of light at such a position and usually is made of a photo-sensitive diode. The combined use of a black-and-white display device and the light pen is well known. For that purpose, a position signal detected by the light pen is applied to a computer, whereby the computer displays information corresponding to the position signal.

There is no special problem with the light pen in black-and-white display. The use of the light pen with the color display device, on the other hand, makes it difficult to detect the exact position of the light pen by raster scanning due to the fact that the persistence time of illumination due to the excitation of phosphors by an electron beam is long as compared with black-and-white display. The persistence time of phosphors that may be defined as the time required for attenuation of 10% to occur after termination of excitation by an electron beam is on the order of several tens of microseconds for green and blue, while it is on the order of 10 to several tens of milliseconds for red. This indicates that it is difficult to detect the exact position of the light pen when red is involved. In view of the fact that the portions on the screen of the color display device indicated by the light pen involve seven colors, it is required that the problem of long persistence be solved for successful use of the light pen with the color display device.

SUMMARY OF THE INVENTION

An object of the present invention is to provide means for accurately detecting the position on the screen of a CRT indicated by a light pen in a color display device employing the CRT.

Another object of the invention is to provide a most simple and low-cost means for detecting the position on the screen of a CRT indicated by a light pen in a color display device employing a CRT.

A further object of the invention is to provide means for detecting the position on the screen of a color display device indicated by a light pen as accurately as when the light pen position is detected on the screen of a CRT monochromatic display device.

Still another object of the invention is to provide means for accurately detecting the position on the screen of a CRT indicated by a light pen with minimal alterations to the circuits of the conventional color display device.

According to the invention, when the light pen indicates a given position on the screen of a CRT, the light-receiving section of the CRT detects a signal from the light pen, in response to which the display operation is temporarily suspended, so that upon attenuation of light due to the persistence characteristic of the phosphors to a level below the lowest level of the sensitivity of the light pen, monochromatic raster scanning on the CRT screen is started. The single color used for monochromatic scanning may be either one of red, blue and green but preferably consists of green in view of its short persistence and the sensitivity characteristic of the light pen sensor.

BRIEF DESCRIPTION OF THE DRAWING

FIG. 1 is a diagram for explaining an embodiment of the invention used with a CRT color display device.

FIG. 2 is a time chart for signals produced in each component element which is drawn for the purpose of explaining the operation of the embodiment of FIG. 1.

FIG. 3 is a diagram showing another embodiment of the invention.

DESCRIPTION OF THE PREFERRED EMBODIMENTS

An embodiment of the present invention is illustrated in FIG. 1. Numerals, characters, charts and other desired patterns are displayed on the screen of a CRT color display unit 1. When a light pen 2 indicates a given position on the display face, the ability of the light pen to convert a light signal into an electrical signal depending on the presence or absence of light causes an electrical signal to be produced from the output terminal of the light pen. This electrical signal is applied as an input signal to an amplifier 4 through a switch 3. Then the signal is amplified by the amplifier 4 to such a level as to enable a control section to be energized, and applied to a one-shot multivibrator circuit 5 which is a well-known circuit to produce a signal of fixed pulse width. The output signal from the one-shot multivibrator is applied to an AND circuit 11. The other input to the AND circuit 11 is a signal showing the state in which a J-K flip-flop 17 is not set, the J-K flip-flop being energized at the fall point of an input signal thereto. The output from the AND circuit 11 is applied to another one-shot multivibrator circuit 6 which generates, like the other one-shot multivibrator circuit 5, an output signal of fixed pulse width. This output signal from the one-shot multivibrator circuit 6 is applied to an OR circuit 15 and the J-K flip-flop circuit 17. The output signal from the OR circuit 15 is applied to a NOT circuit 22, whereupon the output signal from the NOT circuit 22 is applied to AND circuits 7, 8 and 10 to which a red color signal 24, a green color signal 25 and a blue color signal 26 are applied respectively, together with a video signal 23. The output signals from the AND circuits 7, 8 and 10 are applied as input signals to electron guns for red, green and blue respectively. Among the output signals from the AND circuits 7, 8 and 10, the output signal from the AND circuit 8 is applied through an OR circuit 16 to the electron gun for green. The output signal from the NOT circuit 22 which is one of the input signals to each of the AND circuits 7, 8 and 10 becomes a "0" signal when light is detected by the light pen, so that the condition of generating the output signals from the AND circuits 7, 8 and 10 is not satisfied, with the result that the image on the CRT screen disappears.

On the other hand, when the output signal of the multivibrator 6 is turned OFF following a predetermined period of ON state, the fall portion of the output signal causes the flip-flop 17 to be set as shown in the drawing, whereby the output signal of the AND circuit 11 becomes a "0" signal. The flip-flop 17 is turned ON and produces the output signal 17', which is applied through the OR circuit 15 and NOT circuit 22 to the AND circuits 7, 8 and 10. As a result, even when the output signal of the multivibrator 6 is in the "0" state, the display on the CRT screen continues to be prevented by the output signal 17' from the flip-flop 17.

However, in the event that the output signal 17' of the flip-flop 17 is turned ON and at the same time a synchronizing pulse is applied to an AND circuit 12, a flip-flop 18 is set and the output signal 18' therefrom is an ON signal. This signal is applied through the AND circuit 9 and the OR circuit 16 to the electron gun G, whereupon the display which has been heretofore stopped is resumed on the CRT screen with green scanning lines. On the other hand, when clock pulses 28 are applied to the AND circuit 14 in addition to the "ON" output signal 18' from the flip-flop 18, the AND circuit 14 produces an "ON" signal, so that clock pulses begin to be counted by a pulse counter 20. The energization of the pulse counter 20 coincides with the time at which the flip-flop 18 is set, that is, the green monochromatic scanning on the CRT screen begins.

The output signal 18' of the flip-flop 18 is applied to a time delay element 19 and, after a given delay time an output thereof, is applied to one of the input terminals of an AND circuit 13. The output signal from the one-shot multivibrator circuit 6 is maintained "ON" for a period of time corresponding to a pulse width that is so predetermined as to be longer than maximum persistence time. As a result, it is considered that the instant the flip-flop 17 is set at the fall point of the output signal of the one-shot multivibrator circuit 6, the detection signal from the light pen 2 is in the "0" state in which display on the CRT screen is completely erased. When light is again detected by the light pen with green monochromatic scanning in response to the output signal 18' from the flip-flop 18, the output signal from the one-shot multivibrator circuit 5 is turned ON as in the preceding case, so that energization of the AND circuit 13 causes the flip-flops 17 and 18 to be reset. As a result, the output signal from the flip-flop 18 becomes zero, the AND circuit 14 is de-energized, and the counting operation of the counter 20 stops, thereby enabling the position of light pen 2 to be detected on the basis of the counting results. At the same time, the AND circuit 13 applies an interrupt signal 29 to the computer 21 thereby to enable the computer 21 to perform such processes as display of information in accordance with the contents of the counter 20.

The operation of the embodiment shown in FIG. 1 will be explained more in detail below with reference to the time chart of FIG. 2.

Assume that the operator points at a desired position on the CRT screen with his light pen and the switch 3 is closed at time $t_1$ as shown in (b) of FIG. 2. A signal from the light-receiving section of the light pen is amplified by the amplifier 4, the output of which causes the one-shot multivibrator circuit 5 to be triggered at time $t_1$ as shown in (c). In view of the fact that the J-K flip-flop 17 is not set under this condition, the AND circuit 11 produces a "1" signal thereby to trigger the one-shot multivibrator circuit 6 as shown in (d) of FIG. 2. The output signal thus produced from the one-shot multivibrator circuit 6 is applied through the OR circuit 15 and NOT gate 22 to the AND gates 7, 8 and 10, whereupon the display operation is stopped as will be noted from (a) of FIG. 2. In this connection, the operating time $t_1$ to $t_2$ of the one-shot multivibrator 6 is preset at a value longer than the maximum time required for the persistence due to the phosphors on the CRT screen to be attenuated sufficiently below the minimum sensitivity of the light pen 2. At the fall point $t_2$ of output wave from the one-shot multivibrator 6 shown in (d), the flip-flop 17 is triggered [(e) of FIG. 2], and its output 17' is applied through the NOT circuit 22 to the AND gates 7, 8 and 10 thereby to continue the inoperative state of the display unit. Thus, no display is resumed even after time $t_2$ as shown in (a) of FIG. 2.

At the next instant, the flip-flop 17 is set, and the output signal therefrom in combination with a synchronizing signal 27 [(f) of FIG. 2] causes the AND gate 12 to produce an output, thereby setting the flip-flop 18 as shown in (g) of FIG. 2. The output signal 18' from the flip-flop 18 is applied through the AND gate 9 and OR gate 16 to the green electron gun G, so that scanning begins on the CRT screen at the starting point thereon at time $t_3$. On the other hand, clock signals from a terminal 28 [(h) of FIG. 2] and the signal 18 are applied to the AND gate 14, whereby the AND gate produces an output to enable the pulse counter 20 to start the counting operation at time $t_3$.

When light is detected by the light pen 2 during the green monochromatic scanning, the multivibrator circuit 5 is again triggered at time $t_4$. The signal 18' is applied through the delay circuit 19 to the AND gate 13 and therefore this signal, in combination with the output signal from the multivibrator circuit 5, enables the AND gate 13 to produce an output, which in the form of an interrupt signal 29 is applied to the computer. At the same time, the flip-flops 17 and 18 are reset thereby to resume normal color display at time $t_4$. By way of illustration, the counts by the pulse counter 20 and the interrupt signal 29 are shown in (i) and (j) of FIG. 2 respectively.

The counts by the counter 20 are delivered to the computer 21 in response to the interrupt signal 29, so that the position of the light pen on the CRT screen is detected, while at the same time performing the decoding of characters and symbols associated therewith and other information processes.

A filter may be mounted on the light detecting section of the light pen to prevent erroneous operation of the light pen by external light, although in that case the disadvantage results that the sensitivity to light of the light pen is reduced depending on the color of the portion on the CRT screen pointed at by the light pen.

The embodiment of FIG. 3 is such that a switch 32 is provided in which switch elements $a$ and $b$ are operatively interlocked. This embodiment comprises a one-shot multivibrator circuit 30 triggered by the closing of the switch element $b$, a voltage source 33 for triggering the multivibrator circuit 30 through the switch element $b$, and an OR gate 31. The switch element $b$ is closed in response to the closing of the switch element $a$ corresponding to the switch 3 of FIG. 1, and therefore it is possible to detect the position of the light pen accurately without regard to the color displayed on CRT screen or filter employed.

Although in the above-described embodiments the fixed length of time $t_1$ to $t_2$ is included in the time period during which normal color display is prevented, there may be alternatively provided means for automatically changing such a length of time in accordance with the persistence characteristic of the color of the portion pointed at by the light pen. In view of the fact that the fixed length of time is longer than the maximum time of persistence, prevention of normal color display for the entire fixed length of time is meaningless when a color with short persistence is involved. As a result, the provision of the means for automatically changing such a length of time permits the speed of position detection by the light pen to be improved.

It will be understood from the above description that the present invention has the great advantage that color displacements and errors in position detection due to the difference of persistence are eliminated during the operation of a light pen on the color display device, thus making it possible to detect the position of the light pen with high precision.

We claim:

1. In a color display device for displaying, in color, a desired pattern on the screen of a cathode-ray tube, an apparatus for detecting a given position on said screen of said cathode-ray tube indicated by a light pen comprising:
   first means, coupled between said cathode-ray tube and said light pen, for preventing the display of a pattern on said screen for a predetermined period of time, upon the generation of a light detection signal from said light pen; and
   second means, coupled between said first means and said cathode ray tube, for causing said cathode-ray tube to initiate a monochromatic scan of said screen upon the termination of said predetermined period of time.

2. An apparatus according to claim 1, wherein said predetermined period of time is longer than the maximum time of persistance of the colors capable of being displayed on said screen of said cathode-ray tube.

3. An apparatus according to claim 1, wherein said first means comprises
   first circuit means for generating a first signal having a duration corresponding to said predetermined period of time, and
   first logic coupled to means, coupled to the input of the color display generation portion of said cathode-ray tube and to the output of said first circuit means and receiving color signal information to be displayed on said screen, for preventing the delivery of said color signal information to said display generation portion during the application of said first signal thereto.

4. An apparatus according to claim 3, wherein said second means comprises
   second logic circuit means, coupled between said first logic circuit means and said first circuit means, for causing said first logic circuit means to prevent the delivery of only a portion of said color signal information to said color display generation portion after the termination of the first signal, whereby said color display generation portion effects a monochromatic scan of said screen.

5. An apppratus according to claim 4, further including third means, coupled to a source of clock pulses and said second logic means, and responsive to the output of said light pen, for counting said clock pulses from the initiation of said scan until said light pen again generates an output during said monochromatic scan, so that said count is representative of the position of said light pen on said screen.

6. An apparatus according to claim 5, wherein said predetermined period of time is longer than the maximum time of persistance of the colors capable of being displayed on said screen of said cathode ray-tube.

7. In a color display device for displaying in color a desired pattern on the screen of a cathode-ray tube, an apparatus for detecting a given position on said screen of said cathode-ray tube indicated by a light pen comprising means for stopping the display on said screen of said cathode-ray tube in response to a light detection signal from said light pen indicating a given position on said screen of said cathode-ray tube, means for detecting the lapse of time $t$ following the stoppage of the display on said screen of said cathode-ray tube, means for starting a monochromatic scanning following the lapse of time $t$, and counter means to start its counting operation simultaneously with the starting of the monochromatic scanning, the counting operation being stopped by a light detection signal from said light pen.

8. An apparatus according to claim 7, in which said time $t$ is set longer than the maximum time of persistence of the colors capable of being displayed on said screen of said cathode-ray tube.

9. An apparatus according to claim 7, further comprising a first switch and an electrical circuit for introducing a light detection signal from said light pen, first means for generating a signal to stop the display on said screen of said cathode-ray tube independently of said first switch and said electrical circuit, a second switch connected in series with said first means and operatively interlocked with said first switch, means for converting the output signal of said first means into a signal of a fixed pulse width, and an OR circuit to which the output signal of said electrical circuit and the output signal of said first means are applied, at least one of said output signal of said electrical circuit and said output signal of said first means constituting said light detection signal from said light pen.

10. An apparatus according to claim 7, further comprising means for starting and stopping the display on said screen of said cathode-ray tube, said means including an AND circuit having color input signals of red, green and blue, and further receiving a video signal and a command signal for ordering the starting and stoppage of the display on said screen of said cathode-ray tube, said command signal constituting said light detection signal from said light pen.

11. An apparatus according to claim 7, in which the color display is resumed and the position indicated by the light pen is detected following said lapse of time $t$.

* * * * *